Dec. 7, 1937.  E. D. EVERY  2,101,537
WELL SCREEN
Filed March 16, 1937
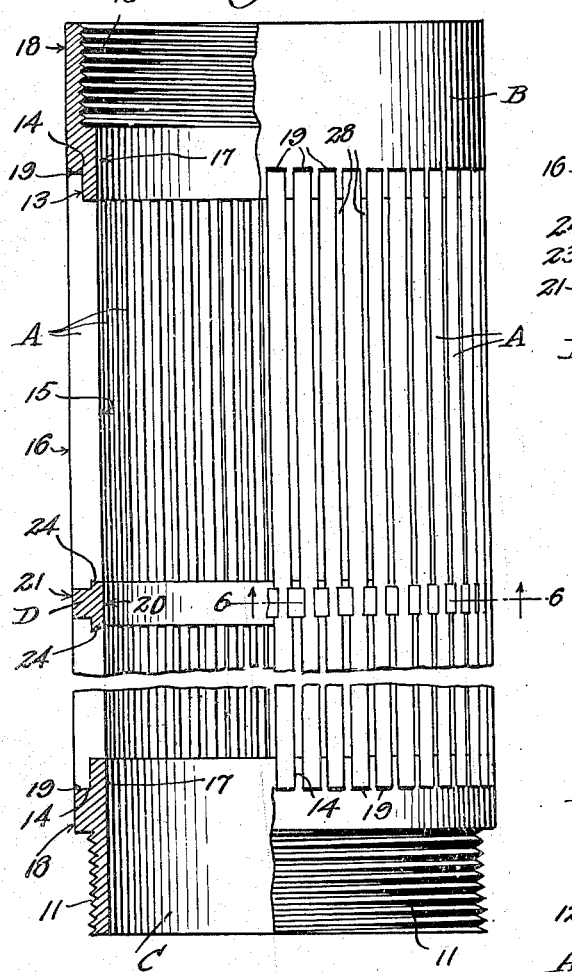
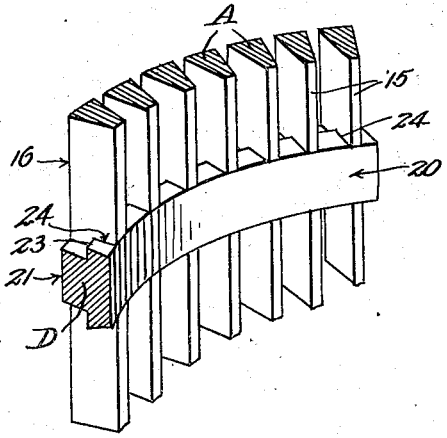
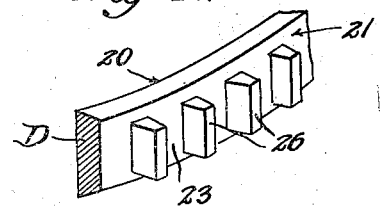
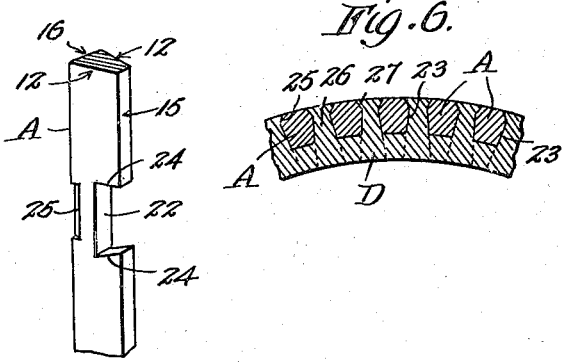
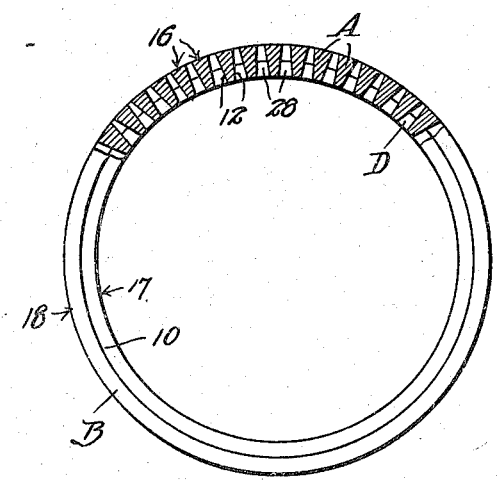
INVENTOR.
Elmer D. Every
BY Clark & Ott
ATTORNEYS.

Patented Dec. 7, 1937

2,101,537

UNITED STATES PATENT OFFICE 2,101,537

WELL SCREEN

Elmer D. Every, Rochelle Park, N. J.

Application March 16, 1937, Serial No. 131,194

5 Claims. (Cl. 166—5)

This invention relates to well screens and comprehends an improved structure by virtue of which the tendency of the screen to become clogged or obstructed is reduced to a minimum.

The invention further resides in the provision of an improved fabricated well screen in which both the inner and outer surfaces thereof are devoid of projecting portions and in which the passages therethrough are so defined as to offer a minimum resistance to the operations of emplacing the screen in the well, removing the same therefrom, and the bailing out of the screen.

The invention further comprehends an improved well screen which is comparatively simple and not unduly complicated in its construction, which may be economically produced and which is highly efficient for its intended purpose.

With the above enumerated and other objects in view, reference is now made to the following specification and accompanying drawing in which there has been disclosed, by way of example, a preferred embodiment of the invention, while the appended claims cover variations and modifications thereof.

In the drawing:

Fig. 1 is a side view on a reduced scale of a well screen constructed in accordance with the present invention, a part thereof being broken away and shown in section to disclose the underlying structure.

Fig. 2 is a plan view of the same with a section thereof broken away.

Fig. 3 is a fragmentary perspective view illustrating the joint between the screen bars and the band.

Fig. 4 is a fragmentary perspective view of a section of the band with the screen bars removed.

Fig. 5 is a fragmentary perspective view of a section of one of the screen bars illustrating the notched portions.

Fig. 6 is a fragmentary enlarged horizontal sectional view of the screen taken approximately on a plane indicated by the line 6—6 in Fig. 1.

Referring to the drawing by characters of reference, the well screen constituting the present invention, is fabricated or built up of elongated members or bars, designated generally by the reference character A, upper and lower end members B and C and one or more intermediate annular members or bands D. The member B is in the form of a sleeve which is reamed and tapped to provide a threaded socket 10, while the member C has a reduced threaded exterior diameter 11 whereby any number of similar screen sections may be assembled to produce a well screen of the desired length.

The bars A are of substantially keystone shape in cross section having inwardly converging opposite side faces 12 and the same are disposed vertically to extend from the upper end member B to the lower end member C and circumferentially spaced with reference to said members. The opposite upper and lower ends of the bars are formed with notches 13 at their inner upper and lower corners and the innermost ends of the members B and C are notched as at 14 to accommodate the notched ends of the bars A, whereby the inner and outer surfaces 15 and 16 of the bars are disposed flush with the inner and outer peripheries 17 and 18 of the members B and C. The outer faces of the bars and outer peripheries of the members B and C, at their meeting edges, are preferably chamfered to facilitate the joining of the same together by a welding 19.

In view of the fact that the distance between the members B and C is relatively great and the bars A are of a substantial length, it is necessary to reinforce the bars between their ends by means of one or more annular members or bands D. In order to dispose the inner and outer surfaces 20 and 21 of the bands D flush with the inner and outer surfaces 15 and 16 of the bars, the bars are provided with transverse or horizontal notches 22 opening through the inner face 15 to receive and fit the band, and the band is provided with radially disposed vertical notches 23 in the outer face or periphery 21 to receive and fit the bars A. Obviously, however, within the scope of the invention this arrangement may be reversed so that the bars may have the notches opening through the outer surfaces thereof and the bands have the notches opening through the inner faces thereof. Preferably, the notches 22 of the bars are provided with inwardly converging upper and lower walls 24 which require the forcing or springing of the notched portions 22 of the bars over the band D. The opposite outer corners of each bar are formed with a chamfered or beveled portion 25 and the webs 26 formed by the notches 23 are upset or peaned over the notched portions 25 as shown at 27 for the purpose of securing the band and bars in assembled relation.

Under this construction and arrangement, it will be observed that due to the cross sectional shape of the bars, the fabricated screen thus produced is formed with inwardly flaring or diverging water passages 28 in the nature of vertically disposed slots which extend from the inner edges of the members B and C to the band D or between adjacent bands where a plurality is employed. By providing slots or passages 28 which flare or diverge inwardly, it will be apparent that any gravel or other foreign matter which enters the restricted outer mouths of the passages will be carried into the interior of the screen without any tendency to bind or jam and thereby clog the passages. It will be further observed, due to the construction set forth, that both the inner and outer surfaces of the fabricated screen are devoid of projecting portions so as to offer a minimum resistance to the operations of emplacing the screen in the well, removing the same therefrom and bailing out, from within the screen, any foreign matter which gains access thereto. It should also be noted that due to the fact that the major measurement of the slots or passages extend vertically, a considerably lesser resistance will be offered to the vertical movement of the screen when emplacing the same within the well or removing the same therefrom. It is also possible, due to the fact that there are no projecting rings inside of the screen structure, to easily effect the removal of obstructions from the slots by cleaning or swabbing the screen by a wire brush.

What is claimed is:

1. A fabricated well screen, including upper and lower cylindrical end members, and a plurality of vertical bars circumferentially spaced with reference to the end members and secured at their opposite ends thereto, said bars having inwardly converging side faces defining between adjacent bars water passages which flare towards the interior of the screen and which have their major dimension disposed vertically, and a reinforcing band of a thickness coinciding with the thickness of the bars and located intermediate the length of the bars, said band and bars having corresponding interengaging notched portions, which notched portions are of such a combined depth as to dispose the inner and outer surfaces of the bars and band in flush relation.

2. A fabricated well screen, including a plurality of circumferentially spaced vertically disposed bars having inwardly converging side faces and having horizontal notches opening through the inner faces, and a horizontally disposed annular band corresponding in thickness to the thickness of the bars and fitted within the notches of the bars, said band having vertically disposed notches in the outer face thereof within which the bars are fitted.

3. A fabricated well screen, including a plurality of circumferentially spaced vertically disposed bars having inwardly converging side faces and having horizontal notches opening through the inner faces, and a horizontally disposed annular band corresponding in thickness to the thickness of the bars and fitted within the notches of the bars, said band having vertically disposed notches in the outer face thereof within which the bars are fitted, the outer corners of the opposite ends of each of said bars being chamfered and the annulus adjacent thereto being upset to overlie said chamfered portions.

4. A fabricated well screen, including a plurality of circumferentially spaced vertically disposed bars having inwardly converging side faces and having horizontal notches opening through the inner faces, said notches having inwardly converging upper and lower walls, and a horizontally disposed annular band corresponding in thickness to the thickness of the bars and fitted within the notches of the bars, said band having vertically disposed notches in the outer face thereof within which the bars are fitted.

5. A fabricated well screen, including a plurality of circumferentially spaced vertically disposed bars having inwardly converging side faces and having horizontal notches opening through one of the remaining faces, and a horizontally disposed annular band corresponding in thickness to the thickness of the bars and fitted within the notches of the bars, said band having vertically disposed notches within which the bars are fitted so that the inner and outer faces of the bars are flush with the inner and outer faces of the band.

ELMER D. EVERY.